(12) United States Patent
Ju et al.

(10) Patent No.: US 7,852,993 B2
(45) Date of Patent: Dec. 14, 2010

(54) SPEECH RECOGNITION ENHANCED CALLER IDENTIFICATION

(75) Inventors: Yun-Cheng Ju, Bellevue, WA (US); David G. Ollason, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1402 days.

(21) Appl. No.: 10/638,902

(22) Filed: Aug. 11, 2003

(65) Prior Publication Data

US 2005/0038648 A1 Feb. 17, 2005

(51) Int. Cl.
*H04M 1/64* (2006.01)

(52) U.S. Cl. .................. 379/88.02; 379/88.26; 704/231; 704/255

(58) Field of Classification Search ............... 379/88.18, 379/88.22–88.26, 142.03, 88.01–88.04; 704/231, 704/255; 709/231, 255; 705/18
See application file for complete search history.

(56) References Cited

U.S. PATENT DOCUMENTS

| | | | | |
|---|---|---|---|---|
| 4,837,804 | A | 6/1989 | Akita | 379/88 |
| 5,842,165 | A * | 11/1998 | Raman et al. | 704/255 |
| 5,978,671 | A | 11/1999 | Foladare et al. | 455/412 |
| 6,496,571 | B1 | 12/2002 | Wilson | 379/93.23 |
| 7,136,458 | B1 * | 11/2006 | Zellner et al. | 379/88.02 |
| 7,164,759 | B2 * | 1/2007 | Lebowitz et al. | 379/142.03 |
| 2001/0011230 | A1 | 8/2001 | Morganstein et al. | 705/18 |

FOREIGN PATENT DOCUMENTS

| | | |
|---|---|---|
| CN | 1178023 A | 4/1998 |
| EP | 0 435 580 | 12/1990 |
| EP | 1 009 148 | 6/2000 |
| WO | WO/9627872 | 9/1996 |

OTHER PUBLICATIONS

European Search Report.
Chinese Official Action.
Russian Official Action.
Resubmitted Notice of Chinese Second Official Action dated Jul. 10, 2009 for Chinese Appln. No. 200410056729.7, filed Aug. 11, 2004, with Chinese text, and Text of Second Official Action in English. Best available translation.

* cited by examiner

*Primary Examiner*—Md S Elahee
(74) *Attorney, Agent, or Firm*—Westman, Champlin & Kelly, P.A.

(57) ABSTRACT

A process for collecting the identity of a telephone caller is disclosed. In one embodiment, a personalized Context Free Grammar (CFG) is created for each potential call recipient, and is configured to support identification of incoming callers utilizing voice recognition. Each CFG incorporates an indication of high probability callers and probability weights in each CFG are altered accordingly. When a recipient receives a call, the relevant CFG is applied in association with a voice recognition application to enable at least a preliminary identification of the caller. In accordance with another embodiment, the caller confirms identifications. In accordance with one embodiment, standard caller-ID functionality is utilized if possible at least to assist in the caller identification process. In accordance with still another embodiment, voice recognition enhanced caller identification is utilized to provide intelligent call routing functionality.

20 Claims, 5 Drawing Sheets

SPEECH RECOGNITION ENHANCED CALLER IDENTIFICATION

BACKGROUND OF THE INVENTION

The present invention generally pertains to a process for ascertaining the identity of a telephone caller. More specifically, the present invention pertains to an application of speech recognition technology to collect the identity of a telephone caller in instances when traditional caller-ID is not adequate or not available.

Currently, it is common for individuals to receive a relatively large number of voice messages. For example, it is not uncommon for individuals to receive tens of new voice messages over a weekend. In addition, it is not uncommon for individuals to maintain twenty, thirty, or more saved messages on a voice message system. As the number of voice messages increases, the ability to efficiently listen to and sort messages diminishes.

Voice messages typically do not have any reliable indication of caller identity. Caller identification systems are known in the art but are limited to identifying an incoming phone number, which is possibly matched to a presumed caller if the phone number is associated with a person. Such systems only track a telephone and not a speaker. Therefore, the benefit of these caller identification systems to voice message and call routing systems is quite limited.

Without reasonably reliable caller identification information, it is difficult to generate a useful summary list of voice messages to enable a user of a voice message system to efficiently navigate through a collection of new or saved messages. As a result, most voice message systems do not include reliable means for efficiently listening to and/or sorting messages. For example, most current voice message systems present a user with a minimally helpful audio summary such as "you have three new messages and three saved messages." Such summaries do not typically include any information related to the details of any call.

The lack of information associated with voice messages makes them generally more time consuming to review and organize. For example, in contrast to most electronic mail messages, a voice message cannot be eliminated based simply on indirect indications of message content, urgency or origin. In addition, saved voice messages generally cannot be sorted or organized into folders based on indirect indications of message content, urgency or origin.

Listening to and sorting voice messages presently requires a significant investment of time, because a system user must listen to each message simply to extract basic information such as a caller's identity and/or the urgency or subject matter of the phone call. For voice applications, rules generally cannot be implemented to automatically pre-organize messages. For example, it is virtually impossible to implement a rule to delete a voice message, or to save a voice message to a predetermined folder, based on a particular caller's identity and/or the subject matter or urgency of the phone call. Without a consistent indication of a caller's identity, it is also difficult to intelligently route phone calls based on a call recipient's preferences and priorities.

SUMMARY OF THE INVENTION

Embodiments of the present invention pertain to a process for collecting the identity of a telephone caller. In one embodiment, a personalized Context Free Grammar (CFG) is created for each potential call recipient, and is configured to support identification of incoming callers utilizing voice recognition. Each CFG incorporates an indication of high probability callers and probability weights in each CFG are altered accordingly. When a recipient receives a call, the relevant CFG is applied in association with a voice recognition application to enable at least a preliminary identification of the caller. In accordance with another embodiment, the caller confirms identifications. In accordance with one embodiment, standard caller-ID functionality is utilized if possible at least to assist in the caller identification process. In accordance with still another embodiment, voice recognition enhanced caller identification is utilized to provide intelligent call routing functionality.

DETAILED DESCRIPTION OF ILLUSTRATIVE EMBODIMENTS

I. Exemplary Operating Environments

Various aspects of the present invention pertain to an application of speech recognition technology to collect the identity of a caller when traditional caller-ID is not adequate or is not available. Embodiments of the present invention can be implemented in association with a call routing system, wherein a caller is identified and a call is routed accordingly. Embodiments can also be implemented in association with a voice message system, wherein a message leaver is identified and a message is sorted or routed accordingly. Embodiments can also be implemented in association with a combination of call routing and voice message systems. It should also be noted that the present invention is not limited to call routing and voice message systems. These are simply two examples of systems with which embodiments of the present invention can be implemented. Prior to discussing embodiments of the invention in more detail, exemplary computing environments within which the embodiments and their associated systems can be implemented will be discussed.

Figure 1:
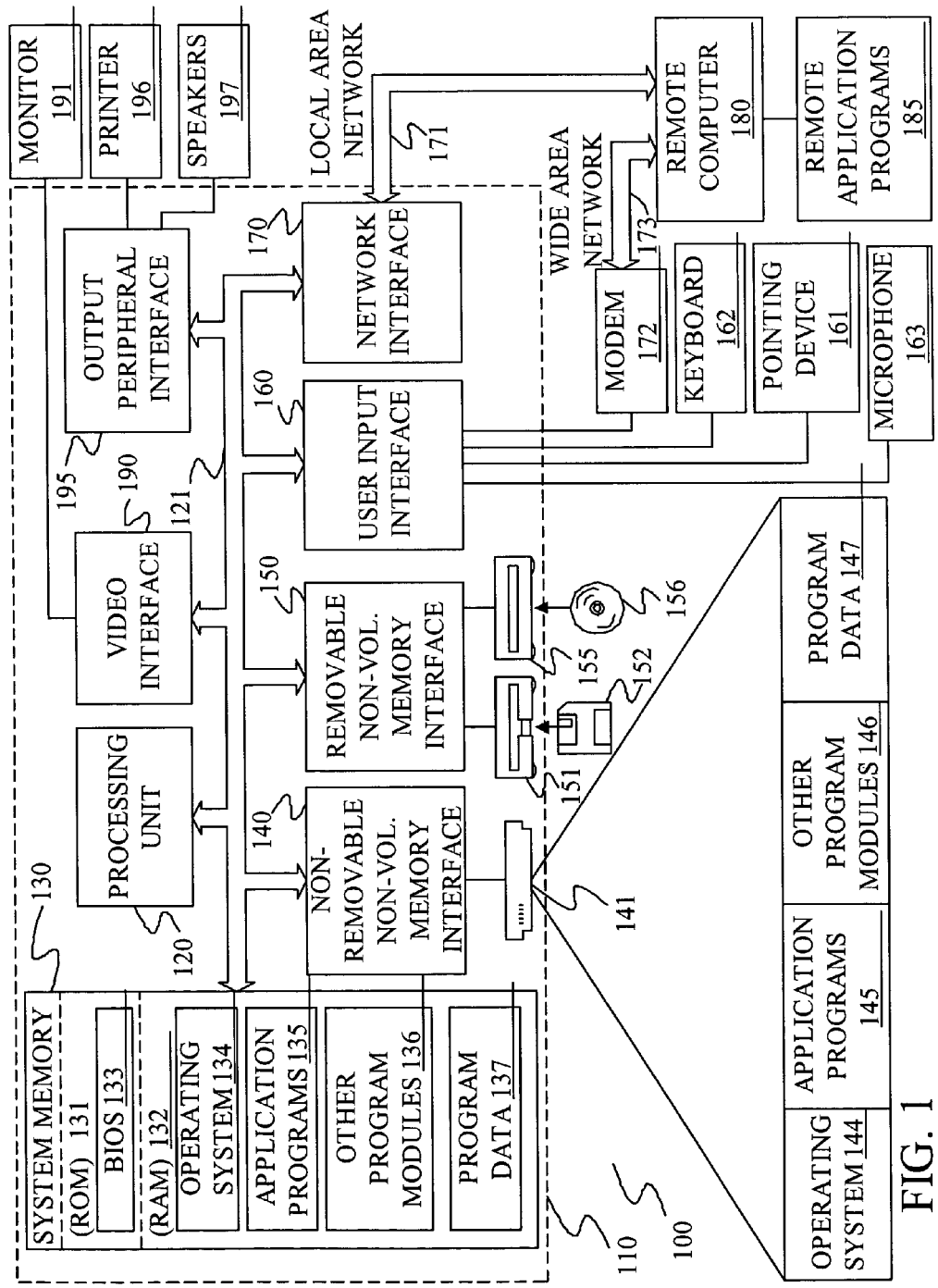
FIG. 1 is a block diagram of one illustrative computing environment.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Voice Message and Call Routing System

Figure 2:
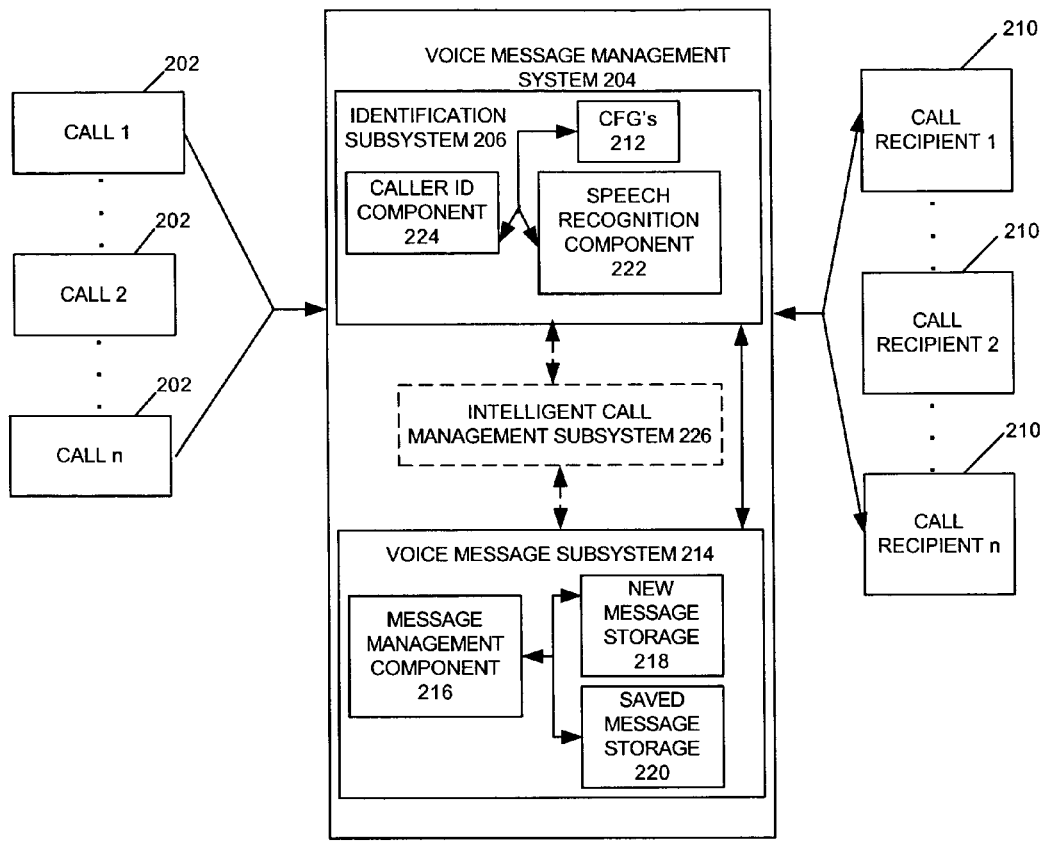
FIG. 2 is a schematic block diagram of a voice message and call routing system.

FIG. 2, in accordance with one aspect of the present invention, is a schematic block diagram of a voice message management system 204. System 204 is illustratively implemented within one of the computing environments discussed in association with FIG. 1. Calls 202 are routed into system 204. Calls 202 are illustratively calls that are directed to a specific recipient 210. Each recipient 210 has an association with voice message management system 204. For example, each recipient 210 is assigned to a "mailbox" associated with system 204, a mailbox being data storage for a collection of new and/or saved voice messages.

Message system 204 utilizes a voice message subsystem 214 to facilitate creation of voice messages by callers for their intended call recipients 210. For example, a caller associated with a call 202 is able to interact with voice message subsystem 214 to generate a message for a particular intended call recipient 210. Voice message subsystem 214 utilizes a message management component 216 to receive and manage messages. New messages are maintained in a data storage location 218, and previously reviewed messages that have not been deleted are maintained in a data storage location 220. It should be noted that new and saved messages could be saved to the same data storage location without departing from the scope of the present invention. A call recipient 210 is illustratively able to interact with voice message subsystem 214 to review his or her new and saved messages, and to delete or save messages at his or her discretion.

For each individual call 202, system 204 utilizes an identification subsystem 206 to identify the caller. Subsystem 206 includes a speech recognition component 222 that is utilized to perform speech recognition in association with a plurality of CFG's 212. The CFG's 212 include a personalized CFG for each call recipient 210. Each CFG is illustratively a collection of nodes and pointers that is traversed by a decoding algorithm to facilitate the process of utilizing speech recognition to collect the identity of a caller associated with a call 202. In accordance with one aspect of the present invention, a given CFG is personalized for a particular recipient 210 in that it is weighted to favor a set of high probability callers for that recipient. The nature of the content of CFG's 212 will be described in greater detail in relation to FIG. 3.

Figure 4:
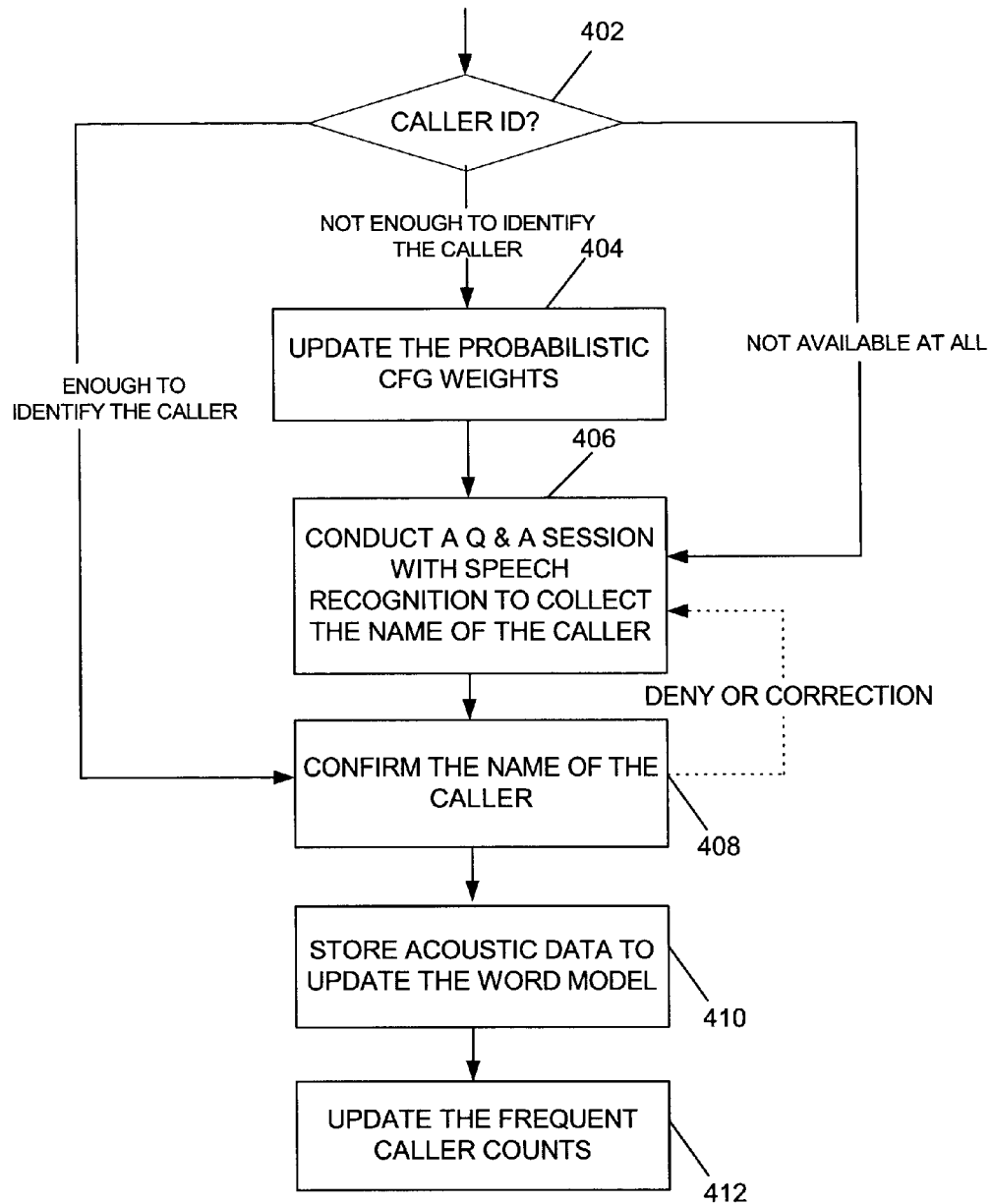
FIG. 4 is a flow diagram illustrating steps associated with implementing a caller identification system that incorporates speech recognition.

In accordance with one embodiment, a caller generating a call to system 204 interacts with subsystem 206 and, given a predetermined set of circumstances that will be discussed in relation to FIG. 4, is prompted to speak his or her name. A whole word pronunciation model (i.e., an acoustic model) of the caller's name is captured and stored (i.e., stored with speech recognition component 222 or with CFG's 212). In order to overcome deficiencies associated with common letter-to-sound rules, the stored word models provide accurate pronunciation information as to how each caller enunciates his or her name. Speech recognition component 222 utilizes stored word models to ascertain the identity of repeat callers by applying the appropriate CFG (i.e., the CFG associated with the appropriate call recipient) and comparing stored word models to a word model generated for an unidentified caller. Each of the described word models can illustratively be a sequence of phonemes or a single speech unit without departing from the scope of the present invention.

Identification subsystem 226 also includes a caller-ID component 224. Component 224 is illustratively consistent with known caller identification systems wherein a call is associated with a caller based on its associated originating phone number. In accordance with one embodiment, when caller-ID information is available, it is utilized by identification subsystem 206 as a strong but not assumed indication of the caller's identification. For example, even if caller-ID information is available, identification subsystem 206 will still prompt the caller to confirm their identity.

In accordance with one embodiment, in instances where caller-ID is not helpful in identifying the caller associated with a call 202, contextual information related to the caller-ID information is used intelligently to update probabilities in the CFG framework. Identification subsystem 206 can be configured to utilize supplemental information to assist in making contextual assumptions.

For example, identification subsystem 206 can be provided with access to a list of individuals expected to be meeting in a plurality of specific conference rooms. When a call comes in that includes traditional caller-ID information consistent with call origination from one of the listed conference rooms, identification subsystem 206 is configured to adjust the relevant call recipient's CFG such that probabilistic weights are increased for callers scheduled to be meeting in that particular conference room. In another example, identification subsystem 206 is provided with access to a list of rooms and employees in a particular building. When a call comes in indicating call origination from a listed conference room, the relevant call recipient's CFG is adjusted such that probabilistic weights are increased for callers working in the same building as the conference room.

In accordance with one aspect of the present invention, CFG's 212, caller-ID component 224 and speech recognition component 222 are utilized in a predetermined organized scheme to identify a caller. Details as to how the components are systematically applied are described below in relation to FIG. 4.

In accordance with one embodiment, once a caller's identity has been collected and associated with a voice message, message management component 216 will sort and categorize the message accordingly. For example, when a call recipient 210 interacts with voice message subsystem 214 to review new or saved messages, they are illustratively presented with informative caller-based options such as "you have three new messages from you wife, two new messages from your boss and three old messages from Roy Williams . . . press one to listen to the messages from your wife, two to listen to messages from you boss or three to listen to messages from Roy Williams." This is an improvement over less informative options such as "you have five new messages and three old messages, press one to listen to old messages or two to listen to new messages." In accordance with one embodiment, the sorting is based on subject matter and/or urgency rather than, or in addition to, the identification of callers. Presumptions as to subject matter and/or urgency are illustratively based on the identity of various callers, and are illustratively selected or programmed by a call recipient based on his or her preferences.

Identification information (i.e., including caller identity as well as presumption-based subject matter and/or urgency information) can be utilized to provide call recipients 210 with intelligent call routing options such as intelligent call screening and/or call forwarding. Such call routing applications will be described in greater detail below in relation to FIG. 5. Intelligent call management subsystem 226, an optional component, illustratively interacts with identification subsystem 206 and voice message subsystem 214 to provide the intelligent call routing applications.

III. CFG's 212

Figure 3:
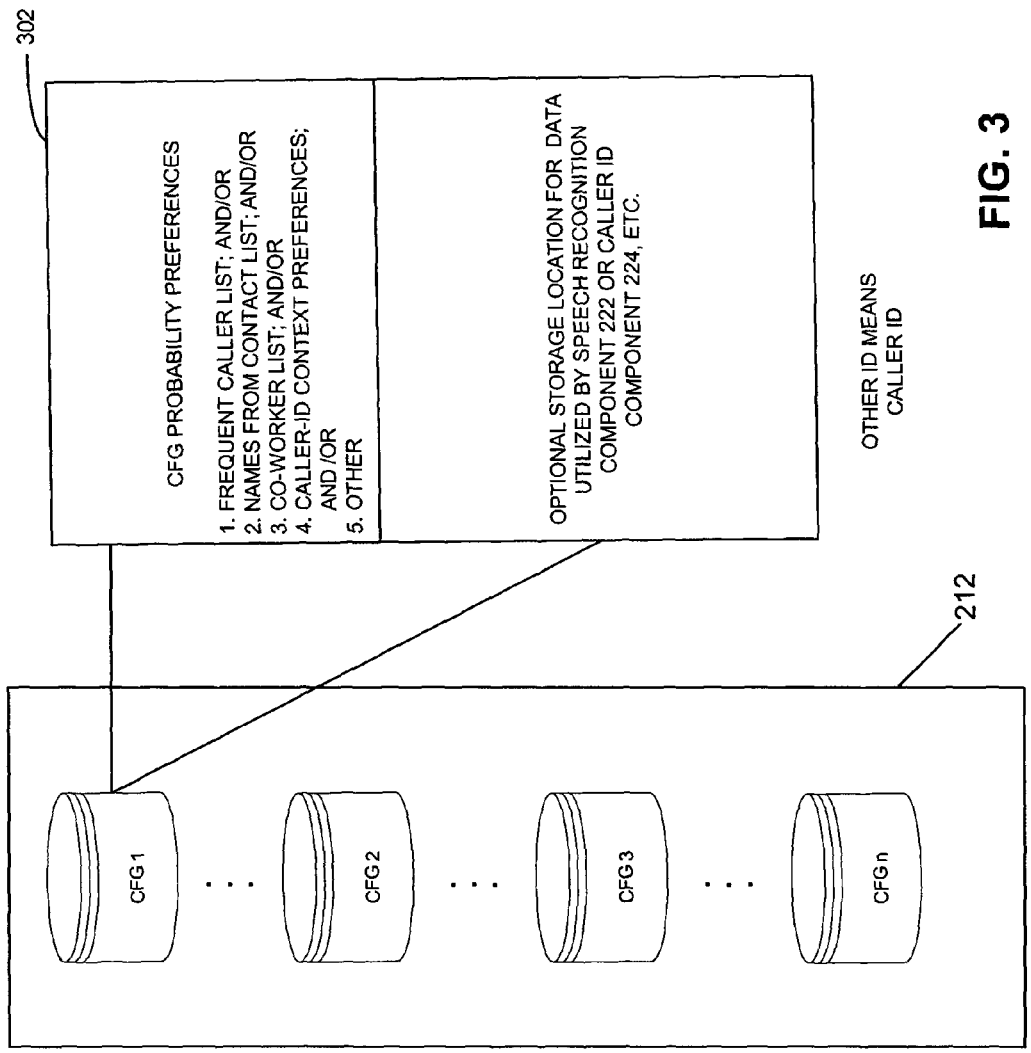
FIG. 3 is a schematic block representation of the content of CFG's.

FIG. 3. is a schematic block representation of CFG's 212, which is actually a collection of individual CFG's. Each individual CFG is illustratively personalized for a specific call recipient 210. The particular CFG utilized in association with speech recognition component 222 to identify a caller is dependent upon to which call recipient a call 202 is directed.

Identification subsystem 206 enables detailed information related to caller identity to be reliably collected utilizing speech recognition. The speech recognition, which is carried out by component 222, is particularly reliable because it incorporates 1) creation of whole word pronunciation models for the names of repeat callers, and 2) context sensitive personalized speech recognition grammars (i.e., CFG's 212). Still further, traditional caller-ID information, such as that collected by component 224, is utilized when available at least to provide a more accurate probabilistic CFG for the speech recognition identification process. As will be discussed in relation to FIG. 4, a confirmation process can be implemented to ensure even greater reliability.

A given CFG is illustratively personalized for a particular recipient 210 in that it is configured to favor a set of high probability callers for that call recipient. In accordance with one embodiment, as is indicated within block 302, the algorithm associated with a CFG is weighted to favor (i.e., language model probabilities are weighted to favor) identification of callers on a frequent caller list maintained by the associated call recipient. In accordance with another embodiment, the algorithm is weighted to favor identification of callers listed on a contact list (i.e., listed in an address book) maintained by the associated call recipient. In accordance with another embodiment, the algorithm is weighted to favor identification of callers that are included on a list of co-workers to which identification subsystem 206 has access. In accordance with another embodiment, contextual presumptions related to the location of call origin (i.e., based on traditional caller-ID information), are utilized to weight CFG probabilities. All or any of these factors, as well as other factors, can be utilized as the basis for personalizing a call recipient's CFG to improve the likelihood of a correct identification. Within FIG. 3, while a box 302 is only illustrated for one CFG, it is to be understood that the other CFG's are similarly configured.

As is also indicated within box 302, a CFG can also be optionally utilized as a storage location for data utilized to support caller-ID component 224 or speech recognition component 222. For example, acoustic models can be stored within CFG's 212 and utilized by speech recognition component 222. Information compilations, such as co-worker lists, conference room lists, frequent caller lists, conference attendee lists, building room lists, building employee lists and others can be stored within CFG's 212 and utilized by any component of identification subsystem 206 during the caller identification process. Any of the data can alternatively be accessibly stored in a location independent of CFG's 212 without departing from the scope of the present invention.

IV. Process for Achieving Speech Recognition Enchanced Caller Identification In accordance with one aspect of the present invention, CFG's 212, caller-ID component 224 and speech recognition component 222 are utilized by identification subsystem 206 in a predetermined organized scheme to identify a caller. FIG. 4 is a flow diagram illustrating steps associated with the predetermined organized scheme.

The process of FIG. 4 illustratively begins when a call 202 is engaged by voice message management system 204. The first step, as is indicated by block 402 is to utilize caller-ID component 224 to ascertain whether any identification conclusions can be drawn based simply on traditional caller-ID information. In other words, the determination is made as to whether a phone number corresponding to the call 202 is associated with an identified individual. If the caller-ID information is enough to make a reasonable educated guess as to caller identity, then the process proceeds directly to a name confirmation process, which is identified in FIG. 4 as block 408.

Block 408 represents a step wherein identification subsystem 206 obtains confirmation from the caller as to who the caller is. Step 408 serves to confirm or deny an educated identification guess made by identification subsystem 206. For example, the caller is asked a simple question such as "are you Nick Collison?" If the confirmation is unsuccessful, then, in accordance with block 406, a question and answer session is conducted with the caller in order to collect a spoken sample from the caller (i.e., the caller's spoken name), and to identify the caller based on the spoken sample using speech recognition component 222 and CFG's 212.

In particular, following collection of the spoken sample from the caller, the sample is compared by speech recognition component 222 to the language model stored in the relevant call recipient's CFG. This speech recognition process is utilized to make another educated guess as to the caller's identity. The educated guess based on speech recognition is then confirmed or denied by the caller at step 408. If confirmation is denied, then the question and answer session is repeated. The system is illustratively configured to make at least a predetermined number of different identification guesses based on stored speech samples. In accordance with one embodiment, however, after a predetermined number of unsuccessful attempts, the system will give up on identifying the caller. In such cases, the caller's acoustic voice samples may still be stored for subsequent speech recognition identification should the caller's identity subsequently become known. In accordance with one embodiment, identification system 206 enables the user to enter an identity through a telephone keypad.

If the educated guess based on speech recognition is successfully confirmed, then step 410 is performed. At step 410, acoustic data is stored for subsequent use by speech recognition component 222. In accordance with one embodiment, speech recognition component 222 saves either a predetermined number or an unlimited number of acoustic samples for each caller. Maintaining multiple samples enables recognition component 222 to make more accurate comparisons during the identification process (i.e., multiple samples can be compared to a target for greater accuracy).

Following storage of acoustic data, in accordance with block 412, a frequent caller list is updated. The CFG associated with the recipient 210 to which the call 202 was directed illustratively is weighted towards identifying a list of frequent callers. Following a successful and confirmed identification of a caller, in accordance with block 412, the list of callers is modified to add one call to the number of calls received from the confirmed caller. As the list of frequent callers is updated, the weighted CFG should also be updated accordingly. Such updates to the CFG can be accomplished upon command, after every call or on a periodic basis (i.e., daily, weekly, monthly, etc.) It should be noted that, in accordance with one embodiment of the present invention, any CFG preference information source (i.e., frequent callers, names from contact list, list of co-workers, etc.) can be modified, the modified information being utilized to update one or more CFG's on a periodic or requested basis.

It should be noted that if the caller's identification is successfully confirmed based on caller-ID information alone, then step 412 is the next step because step 410 can be skipped because no acoustic speech data is available.

Referring back to block 402, there will be some instances when received caller-ID information is not enough to identify the caller but is enough to give some contextual clue that can be utilized to weight a recipient's CFG toward a proper identification (see "conference room" examples above). In accordance with block 404, CFG weights are adjusted in accordance with contextual caller-ID information. Following the adjustment, in accordance with block 406, an acoustic sample is obtained during a question and answer session with the caller. The remainder of the identification process, including the confirmation step 408, is repeated as indicated in the flow chart and described above.

With still further reference to block 402, in some instances, no useful caller-ID information will be available at all. In such instances, the step 406 question and answer session is conducted immediately and the process repeats itself as indicated in the flow chart and described above.

V. Intelligent Call Routing

In accordance with certain embodiments of the present invention, a caller's identity is collected and confirmed while the caller is still on the line. Accordingly, the collected and confirmed caller identity can be utilized for call routing applications such as but not limited to call screening and call forwarding. The call routing applications are illustratively implemented utilizing intelligent call management subsystem 226 (FIG. 2), which is an optional component.

Figure 5:
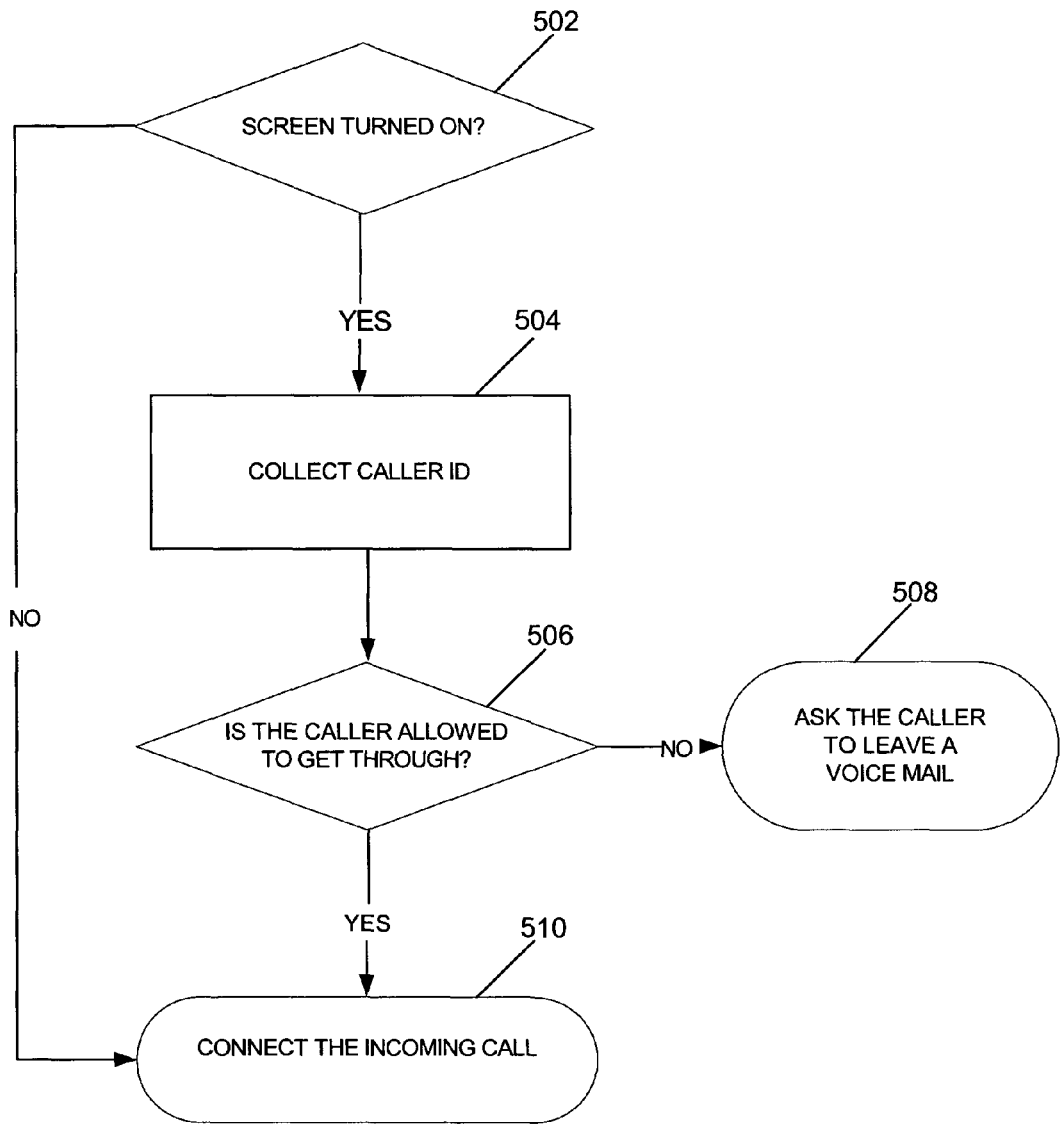
FIG. 5 is a flow diagram illustrating steps associated with implementing an intelligent call routing functionality.

FIG. 5 is a flow chart illustrating intelligent call screening, in accordance with one aspect of the present invention. The process illustratively begins when a call 202 comes into the system. The first step, which is indicated by block 502, is for system 221 to determine whether the intelligent screen function is on. If it is not, then all calls are routed through to their intened recipient (block 510). If the function is on, then the caller's identity is ascertained by subsystem 206 in accordance with block 504. The identity is illustratively, although not necessarily, ascertained utilizing the process described in relation to FIG. 4.

In accordance with block 506, the ascertained caller identity is compared to system settings to determine if the caller is allowed to get through to the intended recipient 210. If they are allowed, then the call is connected in accordance with block 510. If they are not allowed, then, in accordance with block 508 the caller is transferred to voice message subsystem 214 in order to leave a message.

In accordance with another aspect of the present invention, call forwarding works similar to the described call screening. The primary difference is that instead of utilizing the identity information as a basis for routing a call to either the recipient or a voice message system, the identity information is utilized as a basis for routing a call to one location or another (i.e., to one phone number or another).

In summary, embodiments of the present invention pertain to use of speech recognition to gather caller information in voice message and call routing systems, particularly in circumstances where traditional caller-ID is not adequate or not available at all. In accordance with one aspect of the present invention, caller identification with speech recognition is accomplished in association with the following system components:

1. A personalized CFG is utilized for each potential call recipient. The CFG favors a set of high probability callers. The favored callers belong to a set of names that are given preferences over the rest of common names by getting a higher Language Model weight. For example, frequent callers to a recipient might be favored, names from his/her contact list might be favored, or people who work in the same department might be favored, etc.
2. A whole word (acoustic) model of a name pronunciation for each repeat caller is generated from recordings derived from previous calls. This word model provides accurate pronunciation information as to how each caller enunciates his/her name to overcome the deficiency of common letter-to-sound rules.
3. Traditional caller-ID information is utilized in the confirmation process. When appropriate, caller-ID information, if available, is used intelligently in the probability based framework to directly bring the caller into the confirmation process.
4. Probabilistic CFG is weighted by context. Even in cases where traditional caller-ID is not a trustworthy indicator of caller identity, it still can provide useful context information within the probabilistic based system.
5. Intelligent call screening and call forwarding services can be provided. The system can be extended to be utilized as an intelligent call screening and/or forwarding application.

Although the present invention has been described with reference to preferred embodiments, workers skilled in the art will recognize that changes may be made in form and detail without departing from the spirit and scope of the invention.

What is claimed is:

1. A computer implemented method for ascertaining an identity of a telephone caller associated with an incoming telephone call that is directed to a specific potential call recipient, the method comprising:

creating and storing for a plurality of potential call recipients, including the specific potential call recipient, a separate personalized speech recognition grammar including a callers list that is a listing of potential callers, wherein the callers list for each of the separate personalized speech recognition grammars is customized for its associated potential call recipient in that there is a variation from one callers list to the next in terms of which potential callers are included in the listing of potential callers, the variation being formed so as to reflect a determination of which potential callers are more relevant to the potential call recipient with whom the listing of potential callers is associated; and wherein the separate personalized speech recognition grammar for each of the plurality of potential call recipients contains a collection of data that supports a biased discrimination between the potential callers on the callers list such that certain potential callers on the callers list are more acceptable than others to be selected when the associated personalized speech recognition grammar is applied, said biased discrimination being location-based in that it reflects a determination of, and preference for, a sub-set of less than all potential callers on the callers list that are high probability callers relative to a particular location from which a phone call originates;

wherein the separate personalized speech recognition grammars are stored together as a collection of separate personalized speech recognition grammars;

obtaining a speech sample from the telephone caller;

selecting, based on the identity of the specific potential call recipient, the personalized speech recognition grammar associated with the specific potential call recipient; and utilizing a computer processor that is a functional component of the computer to select the identity of the telephone caller based at least in part on the personalized speech recognition grammar selected as being associated with the specific potential call recipient, wherein selecting the identity of the telephone caller further comprises selecting the identity from the potential callers in the callers list included within the personalized speech recognition grammar selected as being associated with the specific potential call recipient, and wherein selecting the identity from the potential callers comprises applying the collection of data included within the personalized speech recognition grammar selected as being associated with the specific potential call recipient so as to apply said biased discrimination relative to a location from which the incoming telephone call originates.

2. The method of claim 1, wherein said collection of data that supports the biased discrimination between the potential callers on the callers list is a weighted language model probability within a speech recognition grammar, the weighted language model probability being configured to favor one speech recognition outcome over another depending upon a particular location from which a phone call originates.

3. The method of claim 1, wherein selecting the identity of the telephone caller further comprises selecting the identity so as to apply an additional biased discrimination factor relative to the potential callers in the callers list included within the personalized speech recognition grammar selected as being associated with the specific potential call recipient, wherein the additional biased discrimination factor is an indication of which callers in the callers list included within the personalized speech recognition grammar selected as being associated with the specific potential call recipient are identified as being a caller that frequently calls the specific potential call recipient.

4. The method of claim 1, wherein selecting the identity of the telephone caller further comprises selecting the identity so as to apply an additional biased discrimination factor relative to the potential callers in the callers list included within the personalized speech recognition grammar selected as being associated with the specific potential call recipient, wherein the additional biased discrimination factor is an indication of which callers in the callers list included within the personalized speech recognition grammar selected as being associated with the specific potential call recipient are identified as being a caller who is listed on a contact list maintained by the specific potential call recipient.

5. The method of claim 1, wherein selecting the identity of the telephone caller further comprises selecting the identity so as to apply an additional biased discrimination factor relative to the potential callers in the callers list included within the personalized speech recognition grammar selected as being associated with the specific potential call recipient, wherein the additional biased discrimination factor is an indication of which callers in the callers list included within the personalized speech recognition grammar selected as being associated with the specific potential call recipient are identified as a co-worker of the specific potential call recipient.

6. The method of claim 1, wherein applying the collection of data included within the personalized speech recognition grammar selected as being associated with the specific potential call recipient so as to apply said biased discrimination based on the location from which the incoming telephone call originates further comprises applying the collection of data included within the personalized speech recognition grammar selected as being associated with the specific potential call recipient so as to apply said biased discrimination based on caller-ID information associated with the incoming telephone call.

7. The method of claim 6, wherein selecting the identity of the telephone caller further comprises selecting the identity so as to apply an additional biased discrimination factor relative to the potential callers in the callers list included within the personalized speech recognition grammar selected as being associated with the specific potential call recipient, wherein the additional biased discrimination factor is an indication of which callers in the callers list included within the personalized speech recognition grammar selected as being associated with the specific potential call recipient are identified as being a caller that frequently calls the specific potential call recipient.

8. The method of claim 1, further comprising interacting with the telephone caller to confirm the identity.

9. The method of claim 1, wherein the method further comprises:

receiving a voice message from the telephone caller for the specific potential call recipient; and sorting the voice message with other voice messages based at least in part on the identity of the phone caller.

10. The method of claim 1, wherein the method further comprises routing the phone call based on the identity of the telephone caller.

11. The method of claim 10, wherein routing the phone call comprises routing at least one call associated with the determined identity to a voice message system.

12. The method of claim 10, wherein routing the phone call comprises routing at least one call associated with the determined identity to an alternate call forwarding number.

13. The method of claim 1, wherein the separate personalized speech recognition grammar for each of the plurality of potential call recipients contains at least one data set that is not for acoustic speaker-identification but is still for discriminating between different potential telephone callers on the callers list, wherein the callers list includes co-workers, conference rooms, frequent callers, conference attendees, building rooms, building employees, and wherein the identification of the telephone called is based at least in part on a location associated with the telephone caller.

14. An identification subsystem configured to facilitate identification of a telephone caller who has initiated a call to a phone call recipient, comprising:

a speech recognition grammar configured to support identification of the telephone caller by facilitating a comparison of a speech sample obtained from the telephone caller to sequences of acoustic models representing language models defined in the speech recognition grammar, the speech recognition grammar being a context free grammar, the context free grammar being personalized for the phone call recipient and including a collection of nodes and pointers that is traversed by a decoding algorithm to facilitate identification of the telephone caller, the identification system including a plurality of context free grammars that is each associated with a particular potential call recipient;

a whole word acoustic sample comprising an acoustic signal produced by a previous caller speaking their name and configured to facilitate identification of the telephone caller;

a speech recognition component that applies the speech sample to the speech recognition grammar to support an identification of the telephone caller and, as a separate function, applies the speech sample to the whole word acoustic sample to support the identification of the telephone caller, wherein the identification of the telephone caller is based on both the whole acoustic sample and the speech recognition grammar;

a caller-ID component that associates the call with the telephone caller based on an originating phone number of the telephone caller;

wherein the identification subsystem, based on availability of caller-ID information, prompts the telephone caller to confirm his or her identify;

wherein the speech recognition grammar is personalized for the phone call recipient in that it is configured to favor an outcome of one telephone caller over a different telephone caller based on a characteristic of the phone call recipient, the characteristic of the recipient being a characteristic other than the name of the phone call recipient, wherein the caller-ID information is utilized to adjust a probability associated with the context free grammar, wherein the phone call recipient and other potential recipients associated with the speech recognition system is each associated with a mailbox, each mailbox including data storage for a collection of new and saved voice messages, and wherein the voice messages are sorted and categorized based at least in part on identities of associated call originators.

15. The identification subsystem of claim 14, wherein the speech recognition grammar is personalized for the phone call recipient in that it is configured to assign a higher language model weight to a language model in the plurality of acoustic models that is associated with at least one high frequency caller, and wherein the speech recognition grammar favors the outcome of the one telephone caller over the different telephone caller based at least in part on a location from which the call originates.

16. The identification subsystem of claim 14, wherein the speech recognition grammar is personalized for the phone call recipient in that it is configured to assign a higher language model weight to a language model in the plurality of acoustic models that is associated with at least one individual who is listed on a contact list maintained by the phone call recipient, and wherein the speech recognition grammar favors the outcome of the one telephone caller over the different telephone caller based at least in part on a meeting schedule.

17. The identification subsystem of claim 14, wherein the speech recognition grammar is personalized for the phone call recipient in that it is configured to assign a higher language model weight to a language model in the plurality of acoustic models that is associated with at least one individual who is a co-worker of the phone call recipient, and wherein the sorting and categorization of voice mails includes audibly presenting information to the phone call recipient that indicates the identities of associated call originators and a number of calls received from each of the associated call originators.

18. The identification subsystem of claim 14, wherein the speech recognition grammar is personalized for the phone call recipient in that it is configured to assign a higher language model weight to a language model in the plurality of acoustic models that is associated with at least one individual who is affiliated with a location from which the phone call is originating, the location being a conference room and the affiliation of the at least one individual to the conference room being that the at least one individual is works in a same building as the conference room.

19. The identification subsystem of claim 14, wherein the speech recognition grammar is personalized for the phone call recipient in that it is configured to assign a higher language model weight to a language model in the plurality of acoustic models that is associated with at least one individual who is affiliated with a location indicated in caller-ID information associated with the call, the caller-ID information being associated as originating from one of a plurality of listed conference rooms, and wherein the affiliation of the at least one individual with the location includes the at least one individual being scheduled to be meeting in the one of a plurality of listed conference rooms at a time of the call.

20. An identification subsystem in a voice message management system, configured to facilitate an identification of a telephone caller who has initiated a call to a phone call recipient, comprising:

a collection means for a collection of context free grammars, each context free grammar being personalized for a specific call recipient of a plurality of specific call recipients, the phone call recipient being one of the plurality of specific call recipients having a personalized context free grammar, the identification subsystem utilizing a particular one of the context free grammars in the collection of context free grammars based at least in part upon an identity of the call recipient to which the call is directed, wherein the personalized context free grammar for the phone call recipient includes at least one callers list of potential callers specifically selected for the phone call recipient, wherein the personalized context free grammar is associated with sequences of acoustic models representing language models, the personalized context free grammar also being preferentially weighted to favor identification of the telephone caller not solely based on speech recognition alone but also based on an identification preference given to callers on the callers list that are identified as being high probability callers in that they are known to frequently place calls to the phone call recipient; and a speech recognition component that utilizes a computer processor that is a component of a computing device to apply a speech sample obtained from the telephone caller to the personalized context free grammar so as to perform the identification of the telephone caller, wherein the identification subsystem prompting the telephone caller to provide the sample, the sample being the telephone caller's name, the identification subsystem capturing and storing a whole word pronunciation model of the telephone caller's name, the whole word pronunciation model being stored with a context free grammar and including a sequence of phonemes.

* * * * *